United States Patent
Mahoney et al.

(10) Patent No.: US 6,941,208 B2
(45) Date of Patent: Sep. 6, 2005

(54) METHOD OF MONITORING EQUIPMENT OF AN AGRICULTURAL MACHINE

(75) Inventors: Brian J. Mahoney, Clive, IA (US); Steven L. Colvin, Hawkeye, IA (US); Arnold Rutz, Rebenstr (DE); Stephen Lang, New Hartford, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/005,226

(22) Filed: Dec. 6, 2004

(65) Prior Publication Data

US 2005/0096810 A1 May 5, 2005

Related U.S. Application Data

(63) Continuation of application No. 10/044,372, filed on Jan. 10, 2002, now abandoned, which is a continuation-in-part of application No. 09/780,105, filed on Feb. 7, 2001, now abandoned.

(51) Int. Cl.$^7$ .............................................. G06F 19/00
(52) U.S. Cl. .............................. 701/50; 701/29; 701/33
(58) Field of Search ............................... 701/29–35, 50; 340/438

(56) References Cited

U.S. PATENT DOCUMENTS

| | | |
|---|---|---|
| 4,296,409 A | 10/1981 | Whitaker et al. |
| 4,671,111 A | 6/1987 | Lemelson |
| 4,839,530 A | 6/1989 | Greenwood |
| 4,893,241 A | 1/1990 | Girodat et al. |
| 5,400,018 A | 3/1995 | Scholl et al. |
| 5,586,130 A | 12/1996 | Doyle |
| 5,714,946 A | 2/1998 | Gottshall et al. |
| 5,808,907 A | 9/1998 | Shetty et al. |
| 6,256,594 B1 | 7/2001 | Yamamoto et al. |
| 6,295,492 B1 | 9/2001 | Lang et al. |
| 6,405,111 B2 | 6/2002 | Rogers et al. |
| 6,560,516 B1 | 5/2003 | Baird et al. |
| 2002/0016655 A1 | 2/2002 | Joso |
| 2002/0103582 A1 | 8/2002 | Ohmura et al. |

FOREIGN PATENT DOCUMENTS

| | | |
|---|---|---|
| DE | 196 14 233 A1 | 4/1995 |
| DE | 695 23 181 T2 | 11/1995 |
| DE | 197 82 159 T1 | 9/1998 |
| DE | 199 03 471 C1 | 1/1999 |
| DE | 199 15 097 A1 | 1/1999 |
| EP | 0960 588 A-1 | 12/1999 |
| GB | 2263376 A | 7/1993 |
| WO | WO 01/84506 A2 | 8/2001 |

Primary Examiner—Gary Chin

(57) ABSTRACT

A method of monitoring equipment of an agricultural machine includes taking a process computer and connecting the same to at least one sensor measuring an operational characteristic of the agricultural machine. The process computer evaluates the data received from the sensor and checks whether they indicate a fault of the agricultural machine. In this case, the data may be below and/or above a predetermined threshold. When such as fault or error occurs, the process computer submits a fault message to a remote station using a communications interface. The fault message contains a fault information identifying a type of the fault.

10 Claims, 3 Drawing Sheets

METHOD OF MONITORING EQUIPMENT OF AN AGRICULTURAL MACHINE

CROSS-REFERENCE TO RELATED APPLICATIONS

This application is a continuation of application Ser. No. 10/044,372, filed Jan. 10, 2002 now abandoned, which is a continuation-in-part of U.S. patent application Ser. No. 09/780,105, filed Feb. 7, 2001 now abandoned.

BACKGROUND OF THE INVENTION

1. Field of the Invention

The invention refers to a monitoring equipment of an agricultural machine, comprising a process computer provided on the agricultural machine, a sensor sensing operational characteristics of the agricultural machine and submitting data containing an information about the sensed characteristics to the process computer, and a communication interface connected to the process computer which is arranged to send fault messages to a station remote from the agricultural machine.

2. Description of the Prior Art

In the German journal BMT Baumaschine+Bautechnik 11–42 (1996), page 46 so-called tele service systems are described, allowing a remote diagnosis, service and control of machines. Thus, data concerning operational characteristics of a machine are sent wirelessly to a central service point, and data for adjusting or controlling the machine are sent back to the machine. Among others, these systems can be used on agricultural machines.

British patent application GB 2 623 376 A describes a vehicle monitoring equipment comprising an assessment means, such as a computerized engine management system, for providing data concerning a predefined operational parameter of the vehicle. Data transmission means are connected to the data assessment means for transmitting such data over a radio link to data reception means remote from the vehicle, for example at a maintenance center. In case the monitoring equipment detects the development of a dangerous fault it can cause its associated data transmission means to dial the number of the master diagnostics computer to notify personnel at the monitoring station of the fault. The master diagnostics computer sends regularly requests to the vehicle, and the monitoring equipment of the latter gives a status report to the monitoring station.

In case of a serious fault, the vehicle monitoring equipment of GB 2 263 376 A thus sends a fault message to the monitoring station. It is not disclosed how the monitoring equipment evaluates the faults, and which data are transmitted.

BRIEF SUMMARY OF THE INVENTION

The object of the present invention is to provide an improved monitoring equipment of an agricultural implement which is capable of sending fault messages to a remote station. The monitoring equipment should allow a fast identification of the error at the remote station. Further, notice should not only be given when faults of operative parts occur, but also when the performance of the agricultural machine is too poor.

The invention proposes a monitoring equipment comprising a process computer that is connected to at least one sensor measuring an operational characteristic of the agricultural machine. The process computer evaluates the data received from the sensor and checks whether they indicate a fault of the agricultural machine. In this case, the data may be below and/or above a predetermined threshold. When such as fault or error occurs, the process computer submits a fault message to a remote station using a communications interface. The fault message contains a fault information identifying a type of the fault.

At the remote location, an identification of the error to process the data from the sensor at the remote location, and a costly and time-consuming transmission of data from the sensor or sensors to the remote location for allowing an identification of the type of the error at the remote station is avoided.

The monitoring equipment can be arranged to check operational characteristics of operative parts of the agricultural machine, for example parameters of the main engine, as oil pressure, temperature and number of rotations. It can also watch operational parameters of any other part of the machine, as number of rotations of a crop processing means, the conveying speed of crop conveying means or, in case of a tractor or telescopic loader, a load of a lifting or towing means of the agricultural machine.

In a preferred embodiment, a sensor of the monitoring equipment is capable of measuring a crop processing characteristic of the agricultural machine. An example is the amount of lost grain in a threshing and separating process, or the amount of processed crop. When the crop processing characteristic is too poor, i.e. the performance of the machine is not good enough, the monitoring equipment is arranged to submit a fault message to the remote station. Thus, it is possible to take measures to rectify the fault already during harvesting. For example, it is possible to send a car with spare parts to the field on which the agricultural machine is working, when necessary.

In another embodiment, the monitoring equipment submits a service interval fault to the remote location in the case that a predefined service interval is exceeded. This invention is also useful in conjunction with fleets of vehicles, including farm equipment, construction equipment, trucks and the like wherein fault information can be sent to those who have owner, custodial or service responsibility for the machines being monitored.

DETAILED DESCRIPTION OF THE INVENTION

Figure 1:
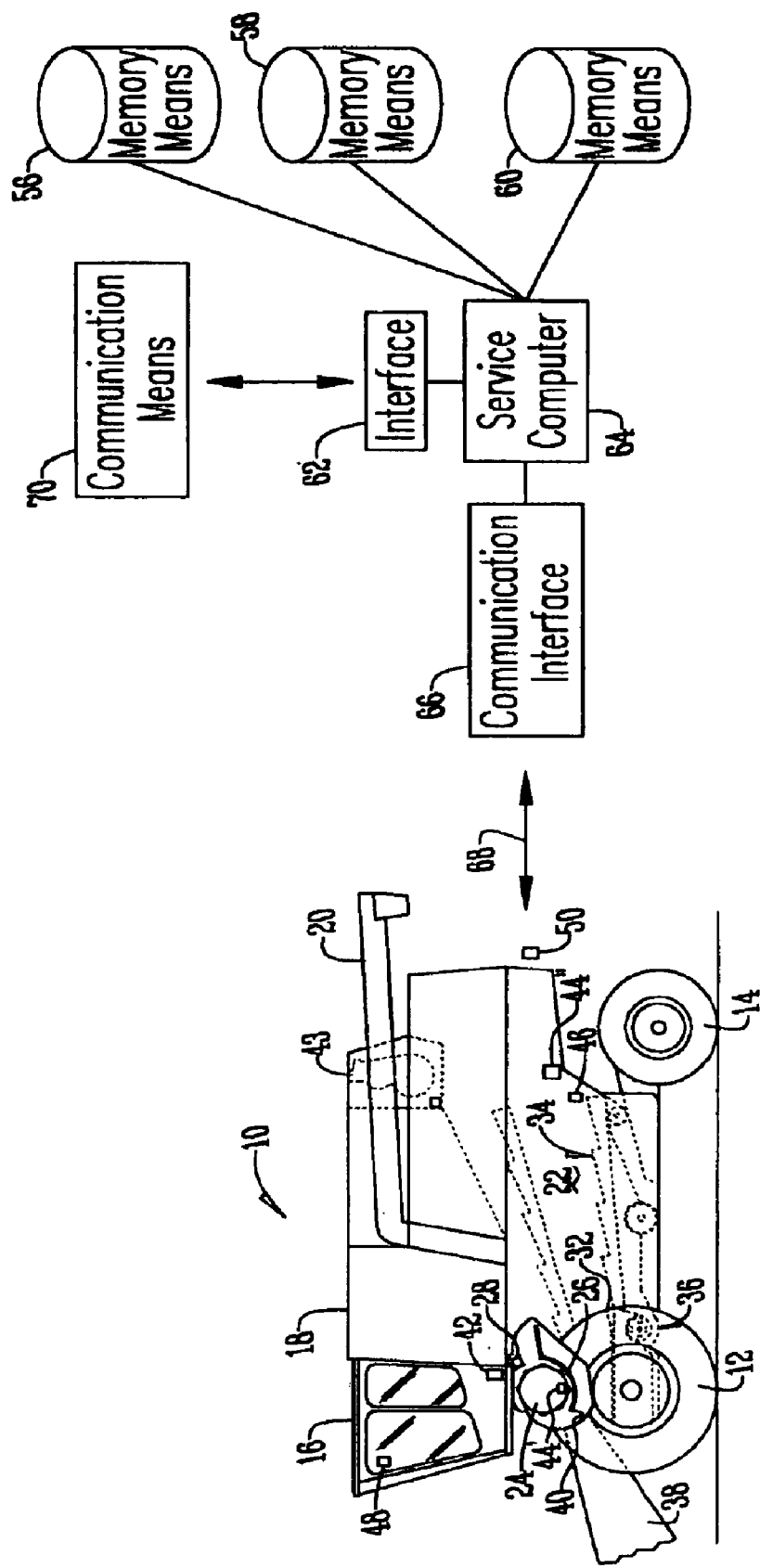
FIG. 1 shows a schematic view of an agricultural combine and a service station.

In FIG. 1, a self-propelled agricultural combine 10 is shown as an example for an agricultural vehicle. The combine 10 is supported on front and rear wheels 12 and 14. The combine 10 is provided with an operator's cab 16 from which an operator can control it. The operator's cab is followed to the rear by a grain tank 18 that can deliver grain deposited in it through a discharge pipe 20 to the outside. The grain tank 18 is supported on a frame 22, in which crop conducted into it is threshed to remove grain from crop residue as the crop is moved in its path past a threshing cylinder 24, a threshing concave 26 and a beater 28. Straw walkers 30 follow the beater 28, as well as a pan 32 and sieves 34, further separate the harvested crop, whereupon finally the threshed-out part of the crop, typically the clean grain, is conveyed into the grain tank 18. The crop residue, i.e. straw, is conveyed over the straw walkers 30 into a rear hood of the combine 10 where it falls onto the ground and lighter components are blown by a blower 36 from the sieves 34 onto the ground. The crop is harvested from the field by a header, not shown, at the front of the combine 10 and is conveyed into the combine by a feederhouse 38, past a stone trap 40 and to the threshing cylinder 24. In place of the straw walkers, one or more rotating separator drums may be provided.

The combine 10 comprises a process computer 42 connected to sensors 44 detecting the status of at least one operative part of the combine 10. In the shown embodiment, a first sensor 44 is located at the main engine 43 of the combine 10 and detects its operating characteristics, as number of rotations and oil pressure. A second sensor 44' is located at the left side of the threshing cylinder 24 and measures the number of rotations the threshing cylinder 24 performs. A third sensor 44" is located below the rear end of the straw shakers 30 and detects the amount of lost grain. Normally, a relatively high number of sensors 44 for detecting assigned operative parameters are provided on the combine 10. These sensors 44 are connected to the process computer 42 by means of a bus system, like a CAN-Bus system. The bus system allows a quasi-simultaneous communication between the process computer 42 and the sensors 44.

The process computer 42 is further connected to a control system comprising at least one actuator 46 for moving operative elements of the combine 10. In the described embodiment, the actuator 46 is arranged to adjust the position of the louvers or the sieves 34. Such an actuator 46 is described in European patent application EP 1068793 A. In another embodiment of the invention, the control system can control the concave clearance or the propelling speed of the combine 10.

The process computer 42 is connected to a driver's information system comprising a display 48 in the driver's cabin. On the display 48, information regarding the status of the operative parts of the combine 10 is given to the operator. The driver's information system 48 further comprises input means such that the driver can influence the operation of the combine 10. He can thus input for example the number of rotations of the threshing cylinder 24 or override proposals given by the process computer 42, which are displayed on the display 48.

The process computer 42 is additionally connected to a communication interface 50 allowing communication with external stations. This communication channel can make use of any wireless communication means, as a public telephone network. The communication interface 50 of the combine 10 is thus arranged to communicate wirelessly via a communication medium schematically indicated with 68 with a communication interface 66 of a service station 52 at a remote location.

The service station 52 comprises a service computer 64 connected to the communication interface 66. The service computer 64 does not have to be connected directly to the communication interface 66. It can alternatively be part of a network and can communicate via the internet (or another network) with the communication interface 66.

The service computer 64 is also connected to three memory means 56, 58 and 60. The first memory means 56 contains a database containing product data. The product data comprise information on nominal operative characteristics of the combine 10. The second memory means 58 contains a database containing machine data regarding the respective combine, as manufacturing date. The third memory means 60 contains a database containing maintenance data on the maintenance services already performed on the combine 10.

The service computer 64 is provided with an interface 62 to external services. The interface 62 can thus be used for communicating with a communication means 70 of an owner, allowing the latter to countercheck whether his combine 10 was serviced in the intervals recommended by the manufacturer. The interface 62 can also set up a connection to a computer of the manufacturer, for updating the first memory means 56. The communication means 70 could alternatively communicate with the communication interface 66, thus avoiding the interface 62. Further, the service computer 64 could be linked via a network (Internet, LAN, etc. to a computer of the machine owner, of a dealer, of a repair shop or of a manufacturer.

The communication means 70 can be a portable or stationary computer connected to a transmission and receiving device. The communication means 70 is also capable of displaying operational parameters of the combine 10 to the owner. The owner could also be able to influence operational parameters of the combine 10.

The service station 52 can be located at the office of a service center for agricultural machines, e. g. at a dealer's house, or at a subsidiary of the manufacturer of the combine. It can also be located in the office of a contractor or of a farmer.

Figure 2:
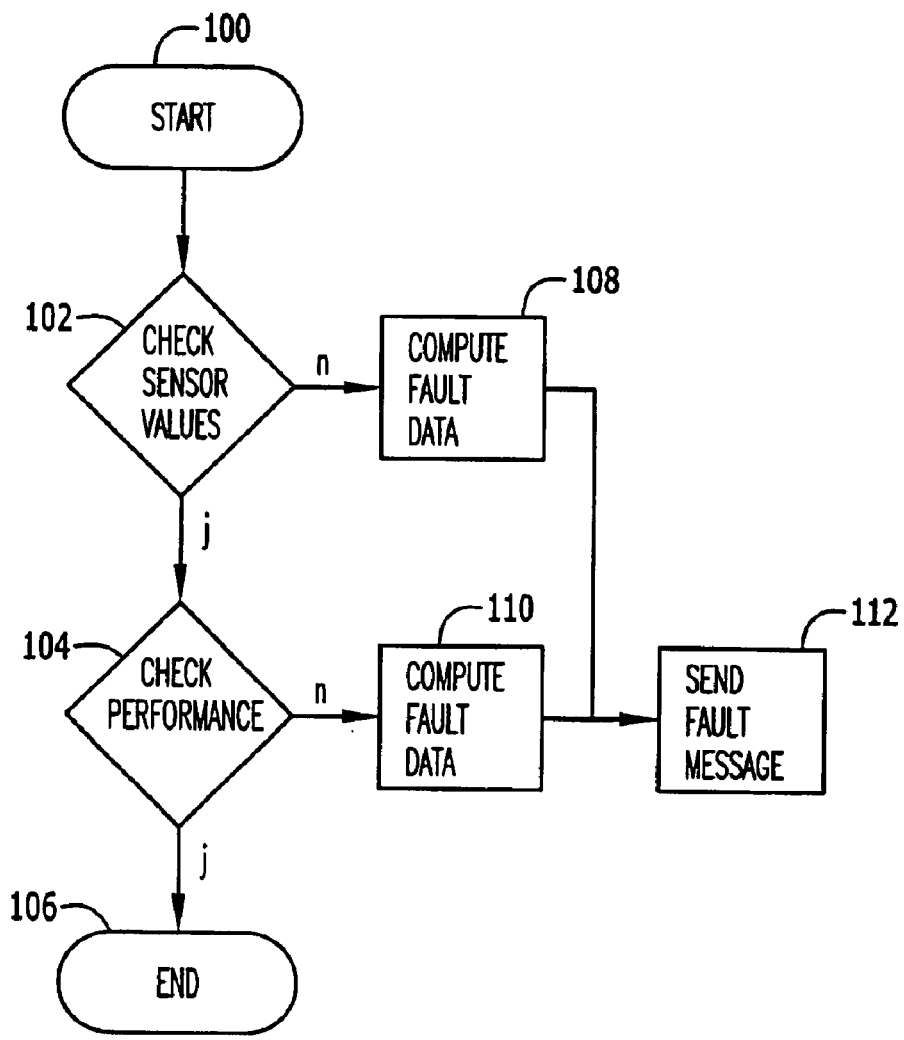
FIG. 2 is a flow diagram illustrating a software routine run in the process computer of the combine checking for dangerous faults.

In FIG. 2, a software routine run in the process computer 42 of the combine 10 is illustrated. The routine is normally not run continuously, but in predefined intervals, e. g. all 100 milliseconds. The routine starts in step 100 and in subsequent step 102 it checks whether the values measured by the sensors 44, 44' provided on the combine are within predefined ranges. These predefined ranges are the normal operation ranges, generally comprising a certain error margin. When for example the oil pressure in the main engine 43 of the combine 10 watched by sensor 44 is beyond the predetermined range, the result of step 102 is "no". In this case, step 108 follows in which the process computer 42 computes a fault information from the information delivered by sensor 44. This fault information can correspond for example to the fact that the oil pressure is too high. It would also be possible to identify an operative element of the combine 10 causing the fault, when an appropriate sensor 44 is provided.

When step 102 reveals no fault, step 104 is executed in which the process computer 42 checks whether performance parameters are outside a predetermined range. The performance parameters can be extracted from data provided by sensor 44. They contain for example the amount of fuel burnt for harvesting a predefined area. Sensor 44" allows a measurement of the percentage of grain lost in the threshing and separating process. When the performance parameter is within (and thus not outside) the predetermined range, step 110 is executed in which a fault information is computed from the data of the sensor 44 and/or 44". It can contain an information on the affected parameter, or in a more sophisticated embodiment, which operative part of the combine is not working (or adjusted) properly. When step 104 reveals no fault, the routine ends at step 106. It should be mentioned that it would be possible to send a fault message when a service interval was exceeded in an embodiment in which the information stored in the third memory means 60 is provided on board of the combine 10. Thus, a fault message is given when the engine hours are outside a range defined by a threshold.

Both steps 108 and 110 are followed by step 112, in which a fault message containing an information about the identified error is sent to the communication interface 66 of the service station 52 by means of the communication interface 50 of the combine 10. A corresponding information is displayed to the driver via the display 48 in the driver's cabin 16.

Figure 3:
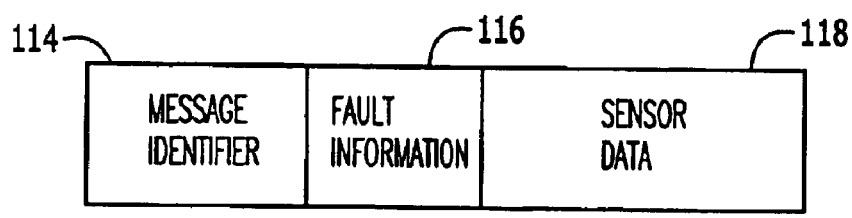
FIG. 3 is a diagram schematically showing a fault message identifying a dangerous fault.

A fault message is schematically indicated in FIG. 3. The message contains three blocks. A first data block 114 is a message identifier, identifying the message as a fault message. A second data block 116 of the message is containing the fault information computed in steps 108 or 110. This fault information contains the type of fault, as engine fault or fault in the crop processing means of the combine, or a performance fault indicating that a performance of the combine 10 is below a predefined limit. A third data block 118 of the message is containing data measured by the sensors 44, 44' and 44", or an information computed therefrom. The third data block also contains data identifying the combine 10 and its location.

Figure 4:
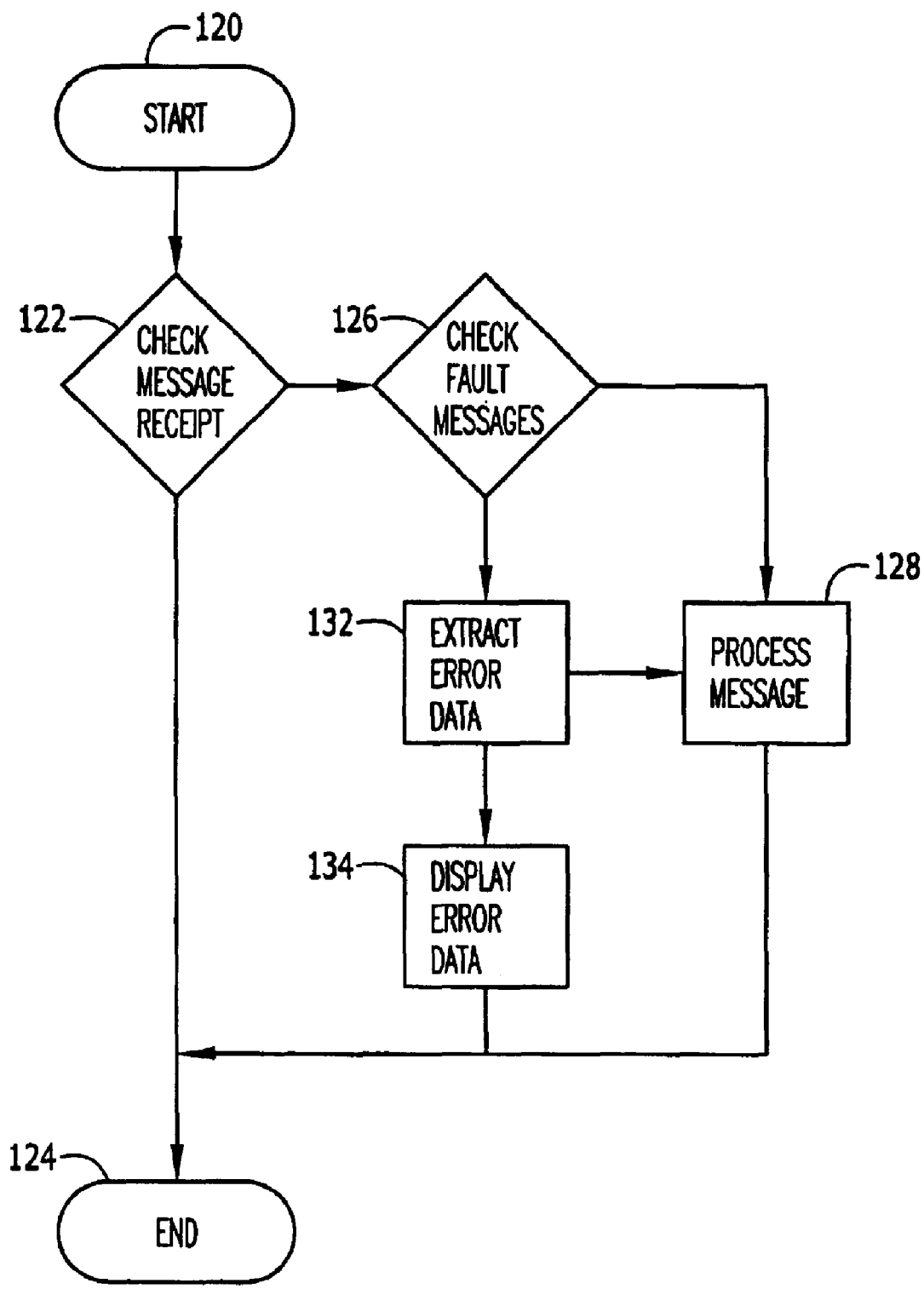
FIG. 4 is a flow diagram illustrating a software routine checking for incoming messages identifying a dangerous fault.

FIG. 4 shows a flow diagram of a routine run in the service computer 64 for checking for incoming fault messages. This routine does not have to run continuously, but it would be sufficient when it is executed in predefined time intervals, as all 1 second. The routine starts in step 120, which is followed by step 122, in which a check is performed whether an external message has been received. These messages can be stored in a mailbox. When no message has been received, step 124 follows in which the routine ends.

On the other hand, when a message was received in step 122, step 126 is performed in which an investigation is performed whether the message is a fault message. This check is performed by checking whether the message identifier identifies the message as a fault message. When the result is "no", step 128 is performed in which the message is processed normally. Thus, for example entries may be made in the first memory means 56 when a message containing performance data of the combine 10 have been received, which may be a response to a request initiated by the service computer 64, or requested by the owner via his communication means 70. In case the result of step 126 is "yes", step 132 is performed in which error data are extracted from the second data block 116 of the message. These data are displayed in step 134 to an operator of the service computer 64, such that the operator can initiate appropriate steps. The fault message can also be sent to the communication means 70 of the owner.

The fault message thus allows the service computer 64 to check fast and easily which kind of fault has occurred and to propose appropriate measures to the service personnel. Not only when a fault occurs, but also when a predetermined performance threshold is exceeded, a message is sent from the agricultural implement to the service station 52.

In the case of fleets of equipment, including farm equipment, construction equipment, trucks, and the like, the same methodology previously described can automatically transmit received default information to a person (e.g., fleet manager) having owner, custodial or service responsibility for the machines in question. Manufacturers of the equipment could also be logical recipients of the default information so as to monitor like equipment in the field similar to models generating default information so as to evaluate whether the default is an isolated default or a design shortcoming that could have possible widespread significance relating to similar machines owned or operated by a plurality of persons or entities.

Having described the preferred embodiment, it will become apparent that various modifications can be made without departing from the scope of the invention as set forth in the accompanying claims.

What is claimed is:

1. A method of monitoring equipment for an agricultural machine, comprising the steps of:

detecting a first status of a first operative part of the agricultural machine;

processing the detected first status to determine if the detected first status falls within a first predefined range;

detecting a second status of a second operative part of the agricultural machine;

processing the detected second status to determine if the detected second status falls within a second predefined range;

automatically transmitting a fault message to a remote location when at least one of the detected first and second status falls outside the first and second predefined range; and wherein the first status measures crop processing information and the second status measures non-crop processing information.

2. The method of claim 1 wherein the non-crop processing information relates to engine performance.

3. The method of claim 1 further comprising the step of determining the type of fault that has occurred at the remote location and proposing appropriate measures.

4. The method of claim 1 further comprising the step of activating an actuator based on at least one of the first and second detected status.

5. The method of claim 1 wherein the remote location has a plurality of message blocks.

6. A device monitoring equipment for an agricultural machine, comprising:

means for detecting a first status of a first operative part of the agricultural machine;

means for processing the detected first status to determine if the detected first status falls within a first predefined range;

means for detecting a second status of a second operative part of the agricultural machine;

means for processing the detected second status to determine if the detected second status falls within a second predefined range;

means for automatically transmitting a fault message to a remote location when at least one of the detected first and second status falls outside the first and second predefined ranges; and wherein the first status measures crop processing information and the second status measures non-crop processing information.

7. The device of claim 6 wherein the non-crop processing information relates to engine performance.

8. The device of claim 6 further comprising mean for determining the type of fault that has occurred at the remote location and proposing appropriate measures.

9. The device of claim 6 further comprising means for activating an actuator based on at least one of the first and second detected status.

10. The device of claim 6 wherein the remote location has a plurality of message blocks.

* * * * *